United States Patent
Chang et al.

(10) Patent No.: US 9,833,014 B2
(45) Date of Patent: Dec. 5, 2017

(54) APPARATUS AND METHOD FOR FLUIDIZED BED TREATMENT OF MATERIALS

(75) Inventors: Kin Hung Jeffrey Chang, Vancouver (CA); Justin Sum Ming Lai, Vancouver (CA)

(73) Assignee: FPS Food Process Solutions Corporation, Richmond (CA)

( * ) Notice: Subject to any disclaimer, the term of this patent is extended or adjusted under 35 U.S.C. 154(b) by 48 days.

(21) Appl. No.: 14/111,496

(22) PCT Filed: Apr. 12, 2012

(86) PCT No.: PCT/CA2012/000356
§ 371 (c)(1),
(2), (4) Date: Nov. 19, 2013

(87) PCT Pub. No.: WO2012/139206
PCT Pub. Date: Oct. 18, 2012

(65) Prior Publication Data
US 2014/0069124 A1    Mar. 13, 2014

(30) Foreign Application Priority Data

Apr. 12, 2011  (CA) ..................................... 2736843

(51) Int. Cl.
*A23L 3/36* (2006.01)
*F25D 13/06* (2006.01)
(Continued)

(52) U.S. Cl.
CPC ............ *A23L 3/361* (2013.01); *F25D 13/067* (2013.01); *F26B 3/08* (2013.01); *F26B 17/04* (2013.01)

(58) Field of Classification Search
CPC .. F25D 13/067; F25D 25/04; F25D 2317/063; F25D 2400/30;
(Continued)

(56) References Cited

U.S. PATENT DOCUMENTS

| 3,169,381 A | 2/1965 | Persson |
| 3,293,768 A * | 12/1966 | Blank ....................... A24B 3/04 |
| | | 34/191 |

(Continued)

FOREIGN PATENT DOCUMENTS

| CA | 2007474 | 7/1991 |
| GB | 995742 | 6/1965 |
| WO | WO 2005/073649 A1 | 8/2005 |

OTHER PUBLICATIONS

International Search Report and Written Opinion of the International Searching Authority for PCT/CA2012/000356 (8 pages).
(Continued)

*Primary Examiner* — Christopher R Zerphey
(74) *Attorney, Agent, or Firm* — Lewis Roca Rothgerber Christie LLP

(57) ABSTRACT

Apparatus and method for treatment of a particulate material employs a conveyor belt for supporting the particulate material for transport and a source of gas for delivery through the conveyor belt to fluidize the particulate material. A gas distribution system is used for controlling the gas flow to create regions of greater and lesser fluidization. This approach avoids the use of mechanical agitation of the conveyor belt which improves efficiency and reliability. The apparatus and method find particular application in the handling of particulate foodstuffs in bulk when treatment such as freezing, heating, or blanching of individual food particles is required.

12 Claims, 5 Drawing Sheets

(51) Int. Cl.
*F26B 3/08* (2006.01)
*F26B 17/04* (2006.01)

(58) Field of Classification Search
CPC .... F25D 2317/0661; A23C 3/361; F26B 3/08; F26B 3/082; F26B 17/04; A23L 3/375; A23L 3/361; B65G 15/60; B65G 17/065
See application file for complete search history.

(56) References Cited

U.S. PATENT DOCUMENTS

| | | | | |
|---|---|---|---|---|
| 3,393,532 A | * | 7/1968 | Khoylian | 62/380 |
| 3,982,404 A | | 9/1976 | Overbye | |
| 4,033,555 A | * | 7/1977 | Fong | 366/101 |
| RE31,765 E | * | 12/1984 | Guibert | 219/400 |
| 5,360,203 A | * | 11/1994 | Yamamoto | B65G 15/60 266/110 |
| 5,408,921 A | * | 4/1995 | Persson | A21B 1/245 126/21 A |
| 5,913,590 A | * | 6/1999 | Backus | 34/401 |

OTHER PUBLICATIONS

Extended European Search Report dated Mar. 10, 2015 in corresponding EP application No. 12771225.5, 4 pages.
English translation of SIPO Office action dated Mar. 3, 2015 in corresponding CN application No. 201280028771.0, 10 pages.

\* cited by examiner

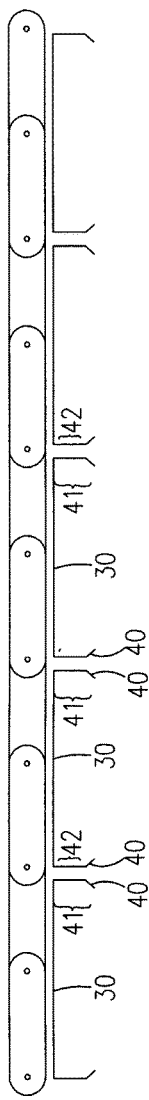
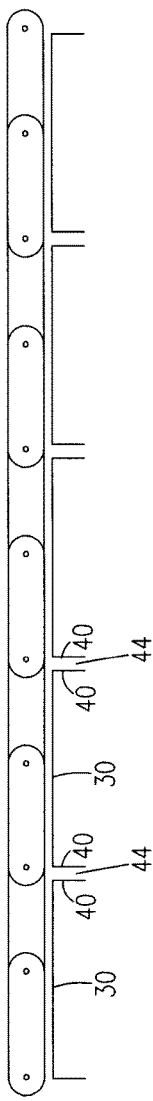
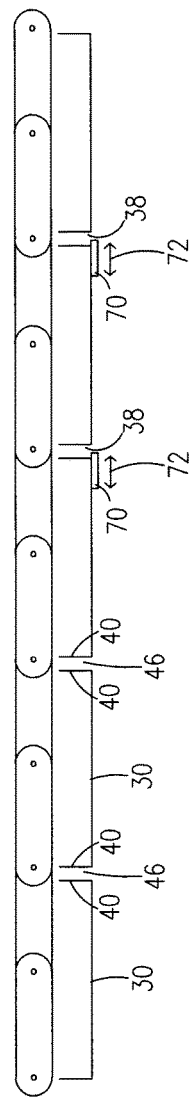
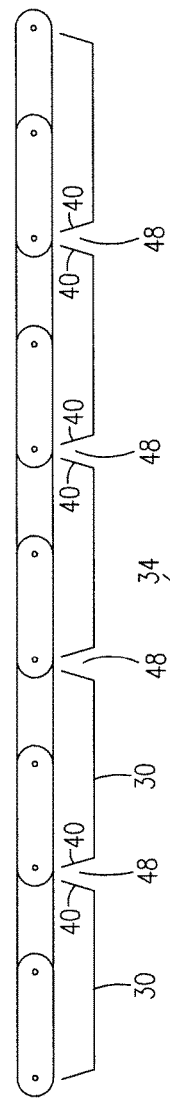
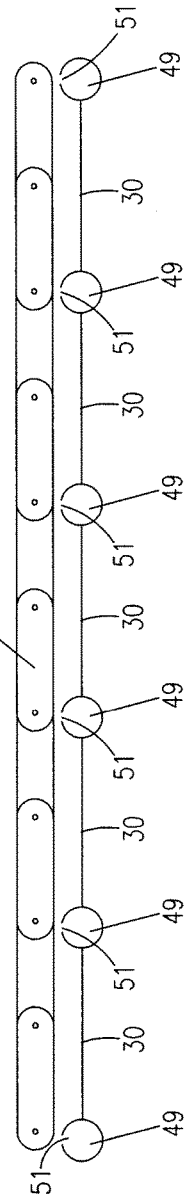

APPARATUS AND METHOD FOR FLUIDIZED BED TREATMENT OF MATERIALS

CROSS-REFERENCE TO RELATED APPLICATION

This application is a National Stage of International Application No. PCT/CA2012/000356, filed Apr. 12, 2012, which claims priority of Canadian patent Application No. 2736843, filed on Apr. 12, 2011, the entire contents of which are incorporated herein.

FIELD OF THE INVENTION

This invention relates to apparatus and methods for treatment of particulate material by creating a fluidized bed of material in which the treated material is maintained as individual, separate particulates. The present invention finds particular application in the food processing industry for freezing of particulate food materials in which the food material is frozen into separate, individual pieces rather than into an agglomerated mass.

BACKGROUND OF THE INVENTION

Fluidization is required in thermal air treatment to separate foodstuffs through a continuous process. The term "thermal air treatment" refers to processes such as freezing by means of cold air or gases, drying or heating via introduction of steam, hot air, water or gas. When upwardly rising air is introduced through a perforated trough or foraminous conveyor belt, fluidization of particulate material on the belt, such as foodstuffs, is initiated. In a fluidized state, particulate foodstuffs receive efficient freezing or heating treatment and maintain their particulate nature.

Complete fluidization of foodstuffs results in the material moving in a fluid manner while being treated. Complete fluidization is not always appropriate when dealing with delicate food products such as raspberries or light food products such as diced onions, and it is therefore, important that the level of fluidization be adjustable to accommodate the material being treated.

The creation of fluidized beds of foodstuffs for freezing or heating is a well known technique in the food processing industry. For example, IQF (individually quick frozen) tunnel freezer designs are common in which particulate foodstuffs to be frozen are transported in a fluidized state on a conveyor through an enclosed structure where cooled air is directed upwardly through the foodstuffs. An important aspect of the fluidization process is to create zones of greater and lesser fluidization which assist in maintaining a cascading flow of the product for optimal access of all particles to the upward gas flow through the product. Fluidization techniques have been developed in the past which rely on perforated fixed trays with mechanical agitation and pulsing mechanisms to vary the fluidization within the product bed. Also, fluidization is often initiated with eccentric rollers below a conveyor belt to lift the product and induce product fluidization.

Examples of prior patents employing different techniques for improved transportation and fluidization of foodstuffs include U.S. Pat. No. 6,477,845 to Larsson which relies on a perforated trough with cyclical movement of the trough with and against the direction of product travel to initiate fluidization. U.S. Pat. No. 5,447,040 to Rothstein discloses an endless foraminous conveyor belt with an electric motor having a control unit for periodically driving the belt in a direction opposite to the direction of product travel to initiate fluidization. U.S. Pat. No. 4,301,659 to Martin et al. teaches a conveyor that includes downward steps to cause a thinning of the product bed on the conveyor and increased fluidization by virtue of the velocity of the air being directed through the bed increasing in the region of the thinned product bed.

Prior fluidization techniques tend to rely on manipulation of the conveyor belt by mechanical equipment within the treatment enclosure where cooling or heating is occurring. As such, the equipment is subject to significant wear and tear during normal operation and the cooled or heated treatment enclosure increases the harshness of the operating environment. Therefore, existing mechanical fluidizations systems have a tendency to breakdown during operation resulting in reduction of the effectiveness of fluidization or complete cessation.

SUMMARY OF THE INVENTION

To address the problems of prior fluidization systems, applicant has developed an apparatus and method which avoids the use of mechanical components for establishing zones of lesser and greater fluidization with resulting improved reliability.

The present invention eliminates the need for mechanical components inside the freezer for establishing fluidization zones, and provides a more energy efficient system by reducing the amount of air required for fluidization and eliminating motors to drive the mechanical components. Particularly for delicate food products, mechanical agitation causes product damage, and the present invention serves to handle these products more gently.

Accordingly, the present invention provides apparatus for treatment of a particulate material comprising:
means for supporting the particulate material for transport;
means for supplying a gas flow through the means for supporting the material; and
means for distributing the gas flow to fluidize the particulate material on the means for supporting the particulate material to create regions of greater and lesser fluidization.

The present invention also provides apparatus for treatment of a particulate material in a fluidized bed comprising:
means for supporting the particulate material for transport;
means for distributing a gas flow through the particulate material to create the fluidized bed on the means for supporting the particulate material and to create regions of greater and lesser fluidization within the bed.

There is also provided apparatus for treatment of a particulate material in a fluidized bed comprising:
a conveyor belt for supporting the particulate material for transport;
a gas distribution system for controlling a gas flow through the particulate material to create the fluidized bed on the conveyor belt and to create regions of greater and lesser fluidization within the bed.

In a further aspect, there is provided a method for treatment of a particulate material comprising:
supporting the particulate material for transport;
supplying a gas flow through the particulate material; and
distributing the gas flow to fluidize the particulate material to create regions of greater and lesser fluidization.

In a still further aspect, there is provided a method for treatment of a particulate material comprising:

creating a fluidized bed by supplying a gas flow through the particulate material; and distributing the gas flow to create regions of greater and lesser fluidization within the fluidized bed.

BRIEF DESCRIPTION OF THE DRAWINGS

Aspects of the present invention are illustrated, merely by way of example, in the accompanying drawings in which:

FIGS. 5A to 5E are cross-sections through the conveyor belt and gas distribution system showing schematically different embodiments of the invention.

DESCRIPTION OF THE PREFERRED EMBODIMENTS

Figure 1:
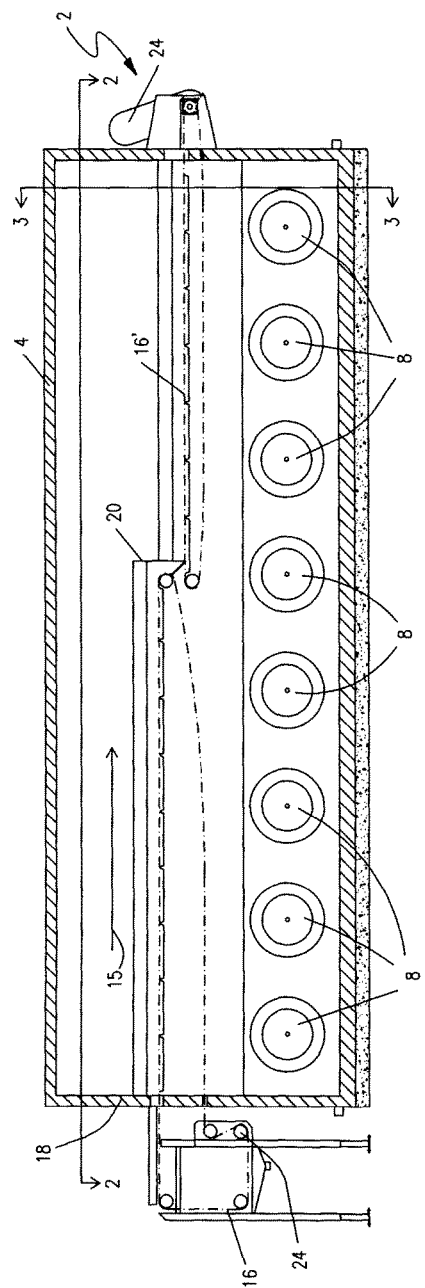
FIG. 1 is a side elevation view of a food processing tunnel incorporating apparatus according to an embodiment of the present invention taken along line 1-1 of FIG. 2 or 3.
Figure 2:
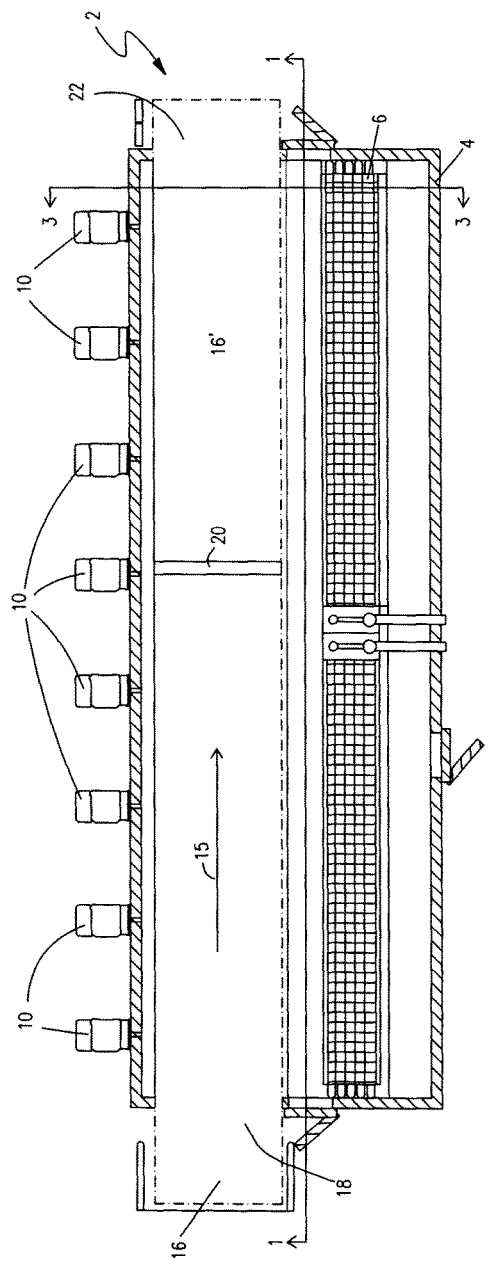
FIG. 2 is a top plan view of the food processing tunnel of FIG. 1 taken along line 2-2 of FIG. 1 or 3.
Figure 3:
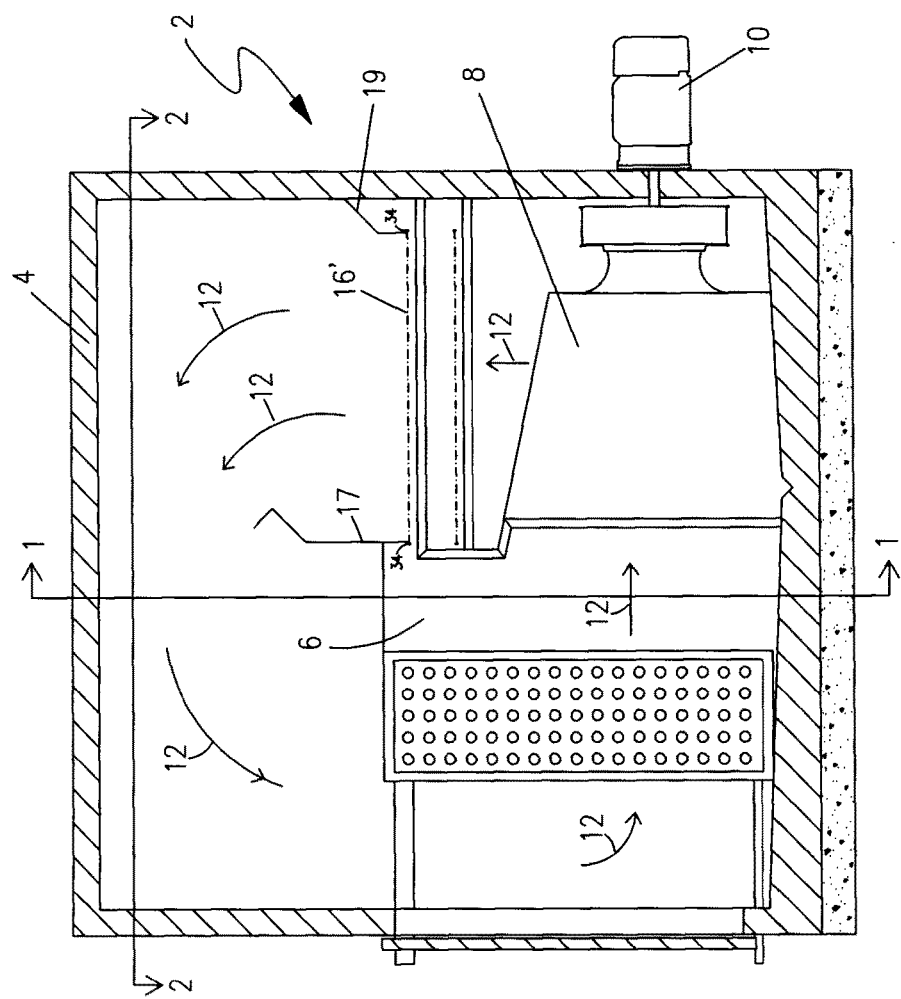
FIG. 3 is an end elevation view of the food processing tunnel of FIG. 1 taken along line 3-3 of FIG. 1 or 2.

Referring to FIGS. 1 to 3, there is shown a food processing unit 2 for treatment of particulate foodstuffs according to an embodiment of the apparatus of the present invention. Food processing unit 2 comprises an insulated enclosure or tunnel 4 with means for supplying a gas flow in the form one or more gas circulation fans 8 driven by external motors 10 to circulate gas through tunnel 2 in a cyclical flow best shown by arrows 12 in FIG. 3. The illustrated arrangement is designed for the freezing of material and a heat exchange unit in the form of a refrigeration unit 6 is provided within the enclosure to generate cooled air. Instead of circulating cooled air, other arrangements are possible including, for example, the use of steam for blanching particulate foodstuffs or the use of alternative gases such as nitrogen or carbon dioxide to freeze foodstuffs. These other arrangements would require appropriate sealing of the tunnel 4 and replacement of refrigeration unit 6 with an appropriate heat exchange unit.

The apparatus of the present invention also includes means for supporting the particulate foodstuff for transport during exposure to the treatment gas, preferably, in the form of a movable conveyor belt. In the illustrated embodiment of FIGS. 1 to 3, the conveyor belt comprises a pair of endless loop conveyor belts 16 and 16'. Conveyor belt 16 is a first conveyor belt on which foodstuff material is introduced into tunnel 4 at entrance 18, and conveyor belt 16' is a second conveyor belt onto which foodstuff is transferred from the first belt at transition point 20 for movement out of the tunnel via exit 22. In other words, in the illustrated embodiment, the foodstuff travels from entrance 18 to exit 22 in the direction indicated by arrow 15 in FIGS. 1 and 2. Other conveyor belt configurations are possible, and will be apparent to a person skilled in the art. It is necessary that the belts convey untreated foodstuffs through tunnel 4 to emerge in a treated (frozen, blanched) form.

Each conveyor belt is preferably formed from plastic or stainless steel and is driven by a motor 24 which is preferably external to the tunnel 4. Each conveyor belt is also perforated to allow passage of the treatment gas upwardly through the belt and through the particulate material on the belt.

Also provided are means for distributing the gas flow to fluidize the particulate material on the conveyor belts into regions of greater and lesser fluidization. In the embodiment of FIGS. 1 to 3, the means for distributing the gas flow comprises a gas distribution system to deliver gas upwardly through the conveyor belt and distribute the gas flow into zones of concentrated and dispersed flow to create the regions of greater and lesser fluidization, respectively.

Figure 4:
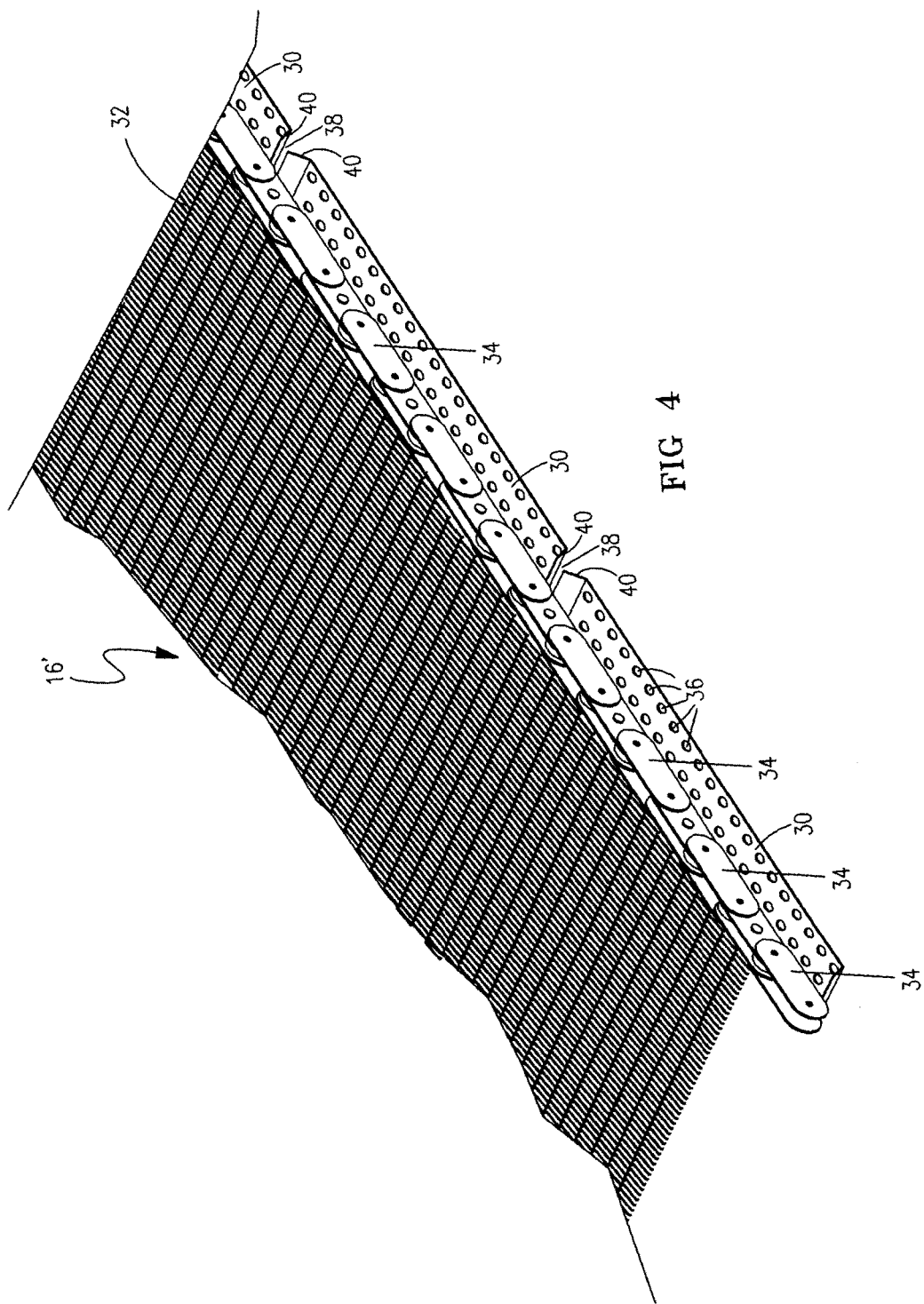
FIG. 4 is a detail view of a conveyor belt and gas distribution system according to an embodiment of the invention.

FIG. 4 is a detailed view of an exemplary conveyor belt 16' with a gas distribution system in the form of at least one plate 30 below the belt. Conveyor belt 16' comprises a movable stainless steel mesh 32 which permits the passage of a gas therethrough. The edges of the steel mesh are support by interconnected roller links 34 that serve to guide and drive the conveyor by engagement of at least some of the links by a rotatable driving sprocket (not shown). The conveyor belt can also be formed of a material such as perforated plastic. As best shown in FIG. 3, roller links 34 at the edges of the conveyor 16' are positioned between upstanding side walls 17 and 19 such that particulate material on the belt that is fluidized by the upward movement of gas through the belt is constrained to remain on the belt.

In the illustrated embodiment of FIG. 4, there are a plurality of plates 30 positioned below conveyor belt 16' in a fixed, stationary configuration with the plates defining an array of openings therethrough. The openings are arranged in various patterns to define the zones of concentrated and dispersed gas flow. In the embodiment of FIG. 4, each plate 30 is formed with a plurality of smaller openings 36 therethrough to define a zone of dispersed gas flow. In this case, the plurality of smaller openings 36 comprise an array of generally circular openings with each opening creating a small column of gas which is directed through the conveyor belt when a gas is directed upwardly past the plate. Together, the plurality of openings 36 create a plurality of gas columns spread over the area of the plate that, in turn, generate a region of lesser fluidization in the particulate material on the conveyor as the conveyor passes over the plate. In addition, in the arrangement of FIG. 4, each of the plurality of plates 30 is spaced apart from an adjacent plate by a gap 38, and each gap 38 between adjacent plates defines a zone of concentrated gas flow in which a single jet of air extending across the belt is directed through the conveyor belt to create a region of greater fluidization in the particulate material on the conveyor as the material is transported by the conveyor over a gap 38. In the present invention, the regions of lesser and greater fluidization are created without the mechanical agitation of the conveyor belt used with prior systems.

As an additional feature of the embodiment of FIG. 4, each of the plurality of plates 30 is preferably formed with a flanged edge 40 adjacent to and running parallel to gap 38 between adjacent plates. Flanged edges 40 are arranged in pairs on opposite sides of a gap and serve to define a passage for controlling the concentrated gas flow. Various arrangements are possible as illustrated in FIGS. 5A through 5D which show schematic cross-sections through links 34 of the conveyor belt and plates 30 below the belt with different flanged edges 40. FIG. 5A shows an arrangement in which the flange edges 40 of adjacent plates cooperate to define a passage 41 which tapers inwardly upwardly to a generally parallel upper portion 42. FIGS. 5B and 5C show arrangements in which the flanged edges 40 define a constant width passage 44 or 46. In FIG. 5B, the flanges depend downwardly from the plates 30, while in FIG. 5C the flanges extend upwardly from the plates. The arrangement of FIG. 5C permits a wider space between the stationary plates and the moving conveyor belt for cleaning purposes. FIG. 5D shows an arrangement identical to that of FIG. 4 in which flanged edges 40 of adjacent plates cooperate to define a passage 48 which tapers constantly inwardly upwardly. Passages which narrow create a venturi effect which accelerates the gas flow to create greater fluidization.

FIG. 5E shows an alternative arrangement which employs individual gas chambers 49 between plates to generate the zones of concentrated gas flow. Each chamber comprises a plenum extending across the width of the conveyor with a slot or plurality of openings 51 adjacent an upper edge of the plenum to direct gas upwardly through the conveyor belt. For example, each chamber may be an air knife unit. Gas may be supplied to each gas chamber 49 by the same fan units 10 that deliver gas to the zones of dispersed gas flow. In a preferred arrangement, a separate gas supply (not shown) is used to provide gas to the gas chambers to ensure a reliable flow.

FIGS. 6A to 6D illustrate schematically alternative schemes for gas distribution systems according to the invention which rely on plate arrangements to deliver gas upwardly through the conveyor belt distributed into zones of concentrated and dispersed flow to create the regions of greater and lesser fluidization, respectively.

Figure 6A:
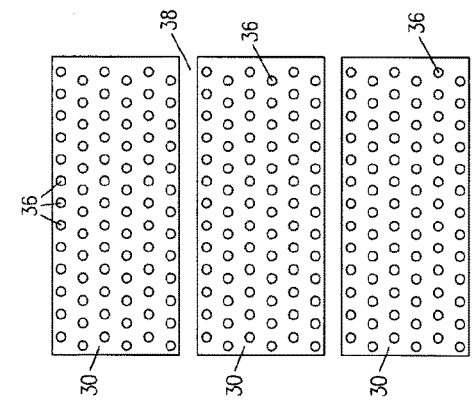
FIGS. 6A to 6F are plan views of various gas distribution systems according to different embodiments of the invention.

For example, FIG. 6A shows the same arrangement as used in the embodiment of FIG. 4 with a plurality of spaced, rectangular plates 30 having a regular array of smaller, generally circular openings 36 extending through the plates to define zones of dispersed gas flow. Gaps 38 between adjacent plates define zones of concentrated gas flow.

Figure 6B:
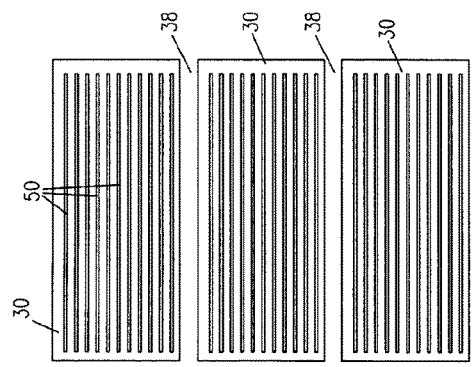
Figure 6C:
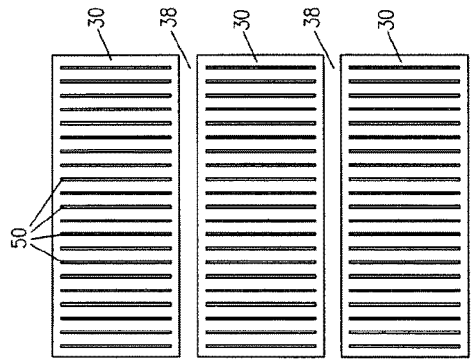

FIGS. 6B and 6C show arrangements similar to that of FIG. 6A except the zones of dispersed gas flow are defined by an array of slots 50 rather than an array of circular openings. In the arrangement of FIG. 6B, slots 50 run transversely to the direction of travel of the conveyor belt, while in the arrangement of FIG. 6C, slots 50 run parallel to the belt travel. Gaps 38 between adjacent plates define zones of concentrated gas flow.

Figure 6D:
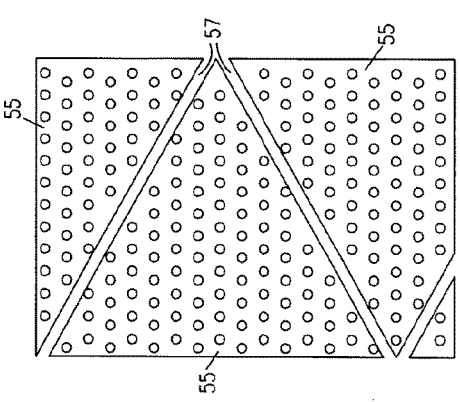

FIG. 6D shows an arrangement in which the plurality of plates 55 are generally triangular in shape to define gaps 57 between adjacent plates for concentrated gas flow that extend obliquely to each other. In the illustrated embodiment, plates 55 are formed with a regular array of generally circular openings to create zones of dispersed gas flow, however, it will be appreciated that a regular array of slots can also be used.

Figure 6E:
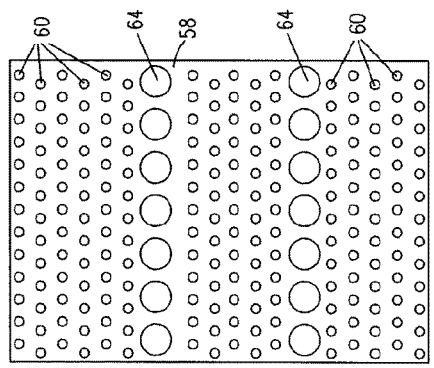
Figure 6F:
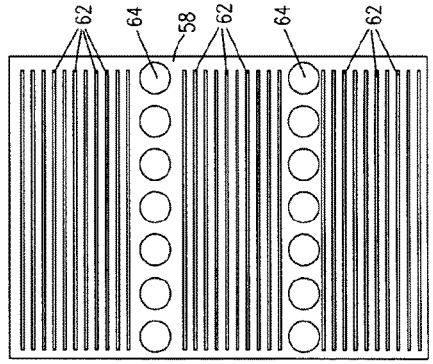

FIGS. 6E and 6F show possible arrangements for a single plate 58 that extends below the entire length of the conveyor belt. In these cases, regular arrays of smaller openings in the form of circles 60 (FIG. 6E) or slots 62 (FIG. 6F) define zones of dispersed gas flow, while at least one larger opening define a zone of concentrated gas flow. In these cases, the at least one larger opening comprises a plurality of aligned, generally circular larger openings 64, and it will be appreciated that large slots can be substituted for the circular openings.

Of course, the skilled person will appreciate that other combinations and permutations of perforations or slots formed in the plates are possible. It is sufficient that the generally smaller openings through and/or between adjacent plates serve to distribute air evenly below the belt to create zones of dispersed gas flow with resultant regions of lesser fluidization in the material bed, while the larger openings serve to establish concentrated higher velocity gas flow zones across the conveyor to generate regions of greater fluidization of the material bed.

In a preferred arrangement, the apparatus of the present invention includes means to control a volume of gas flow delivered from at least one of the zones of concentrated and dispersed gas flow. As shown in FIG. 5C, this preferably takes the form of a damper 70 associated with one or more openings of plates 30. The dampers are movable back and forth as indicated by arrow 72 to adjust the area of the openings available for gas flow. In the illustrated example of FIG. 5C, each damper 70 is associated with a gap 38 between plates defining a zone of concentrated gas flow. Dampers 70 may also be associated with the array of smaller openings in a plate 30 to control the volume of gas delivered through the zones of dispersed gas flow by covering and uncovering wholly or partially a plurality of openings through the plate. Dampers 70 may be installed to operate independently of each other or for movement in a co-ordinated manner by virtue of being joined together by a common control system.

In an alternative approach to controlling the volume of gas flow through plates 30, it is also possible to equip gas circulation fans 8 with variable speed drive motors 10, whereby varying the speed of the motors varies the volume of gas flow delivered to the array of plate openings.

The various embodiments of the apparatus of the present invention described above function most efficiently when the conveyor belt transports the particulate material in a flow of substantially constant depth.

In another aspect, the present invention provides a method of treating particulate material involving the steps of supporting the particulate material for transport, supplying a gas flow through the particulate material, and distributing the gas flow to fluidize the particulate material to create regions of greater and lesser fluidization.

It is contemplated that the present invention can be retrofitted into an existing food processing unit for handling particulate material in a fluidized bed which already makes use of a tunnel enclosure and equipment for generating a gas flow. The retrofittable apparatus would include means for supporting the particulate material for transport, such as a conveyor belt, and means for distributing the gas flow through the particulate material to create the fluidized bed on the conveyor belt with regions of greater and lesser fluidization within the bed. The means for distributing the gas flow may include the plate gas distribution system discussed above.

In another aspect, the present invention provides a method for treatment of a particulate material involving creating a fluidized bed by supplying a gas flow through the particulate material, and distributing the gas flow to create regions of greater and lesser fluidization within the fluidized bed.

As with the prior art, the apparatus and methods of the present invention serves to transport particulate material, preferably, pieces of food or goods, in a partially fluidized bed for treatment, such as freezing or heating, as individual particles. The apparatus and method of the present invention differ from conventional food processing fluidization techniques in that the present invention makes use of variable gas flow through the bed of material to agitate the bed in selected regions to promote fluidization and treatment of the material. The above described apparatus and method avoid the use of mechanical agitating components within the treatment enclosure thereby improving the efficiency and reliability of the treatment.

Although the present invention has been described in some detail by way of example for purposes of clarity and understanding, it will be apparent that certain changes and modifications may be practised within the scope of the appended claims.

The embodiments of the invention in which an exclusive property or privilege is claimed are defined as follows:

1. An apparatus for treatment of a particulate material comprising:
a supporting surface for the particulate material for transport between an entrance and an exit to the apparatus;
a gas source for delivery of a gas flow through the supporting surface and the particulate material; and
a gas distribution system to fluidize the particulate material on the supporting surface for the particulate material, the gas distribution system comprising a plurality of plates adjacent the supporting surface, wherein each one of the plurality of plates is formed with an array of openings therethrough to define a zone of dispersed gas flow and the plurality of plates are spaced apart by a gap between adjacent plates, each gap defining a zone of concentrated gas flow whereby the plates and the gaps between the plates co-operate to distribute the gas flow to create a plurality of repeating regions of lesser and greater fluidization, respectively, within the particulate material between the entrance and the exit, the gas source configured to deliver the gas flow upward through both the array of openings in each of the plurality of plates and each gap between the adjacent plates.

2. The apparatus as claimed in claim 1 in which the supporting surface for the particulate material is adapted to transport the particulate material in a flow having a constant depth.

3. The apparatus as claimed in claim 1 in which the supporting surface for the particulate material for transport comprises a perforated conveyor belt.

4. The apparatus as claimed in claim 1 in which the gas source comprises at least one fan unit.

5. The apparatus as claimed in claim 1 in which the gas is cooled air for freezing the particulate material.

6. The apparatus as claimed in claim 1 in which the gas is steam for blanching the particulate material.

7. The apparatus as claimed in claim 1 in which each opening of the array of openings is circular.

8. The apparatus as claimed in claim 1 in which each opening of the array of openings is a slot.

9. The apparatus as claimed in claim 1 in which the plurality of plates are triangular such that the gaps between adjacent plates extend obliquely to each other.

10. The apparatus as claimed in claim 1 in which the plurality of plates are rectangular to define the gaps between adjacent plates that extend parallel to each other.

11. The apparatus as claimed in claim 1 in which each one of the plurality of plates includes a flanged edge adjacent each gap to define a pair of flanged edges on opposite sides of the gap.

12. Apparatus as claimed in claim 11 in which each pair of flanged edges is adapted to define a passage for controlling the concentrated gas flow.

* * * * *